US006406342B1

(12) United States Patent
Walczak et al.

(10) Patent No.: US 6,406,342 B1
(45) Date of Patent: Jun. 18, 2002

(54) CONTROL HANDLE FOR A MARINE TILLER

(75) Inventors: Thomas J. Walczak, Oconomowoc; William Haluzak, Hartford, both of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/840,378

(22) Filed: Apr. 23, 2001

(51) Int. Cl.[7] ................................................ B60K 41/00

(52) U.S. Cl. .............................. 440/84; 440/86; 440/87

(58) Field of Search .............................. 440/49, 53, 63, 440/84, 85, 86, 87

(56) References Cited

U.S. PATENT DOCUMENTS

| | | | | |
|---|---|---|---|---|
| 4,337,053 A | | 6/1982 | Stevens | 440/87 |
| 4,650,429 A | | 3/1987 | Boda | 440/87 |
| 4,801,282 A | * | 1/1989 | Ogawa et al. | 440/84 |
| 5,180,320 A | | 1/1993 | Calamia et al. | 440/61 |
| 5,340,342 A | | 8/1994 | Boda et al. | 440/86 |
| 5,378,178 A | | 1/1995 | Haman | 440/53 |
| 5,421,755 A | | 6/1995 | Kakizaki | 440/63 |
| 5,736,700 A | * | 4/1998 | Takahashi et al. | 200/4 |
| 5,797,777 A | | 8/1998 | Tsunekawa et al. | 440/84 |
| 5,941,188 A | * | 8/1999 | Takashima | 114/55.5 |
| 6,020,563 A | * | 2/2000 | Risk et al. | 200/61.54 |
| 6,093,066 A | | 7/2000 | Isogawa et al. | 440/63 |
| 6,280,269 B1 | * | 8/2001 | Gaynor | 440/84 |

* cited by examiner

*Primary Examiner*—Stephen Avila
(74) *Attorney, Agent, or Firm*—William D. Lanyi

(57) ABSTRACT

A control handle for a tiller of an outboard motor is provided with a rotatable handle grip portion that includes an end surface which supports a plurality of push buttons that the operator of a marine vessel can depress to actuate certain control mechanisms and devices associated with the outboard motor. These push buttons include trim up and trim down along with gear selector push buttons in a preferred embodiment of the present invention.

11 Claims, 4 Drawing Sheets

CONTROL HANDLE FOR A MARINE TILLER

BACKGROUND OF THE INVENTION

1. Field of the Invention

The present invention is generally related to a tiller handle for an outboard motor and, more particularly, to a handle which comprises one or more control push buttons located at its distal end.

2. Description of the Prior Art

Those skilled in the art of outboard motors are familiar with the use and structure of a tiller handle used for steering and control of an engine. Tiller handles typically have an end portion, or grip portion, that is rotatable about a centerline of the tiller in order to allow the operator of a marine vessel to control the speed of the engine. Some tiller handles also allow the marine vessel operator to change gears by rotating the grip at the distal end of the tiller.

U.S. Pat. No. 5,180,320, which issued to Calamia et al on Jan. 19, 1993, describes a trim switch for a tiller-steered outboard motor. The tiller arm for a marine propulsion device comprises a first end adapted to be connected to a propulsion unit, a second end spaced from the first end, a longitudinal axis and a selectively actuable switch including annular selectively deformable structure surrounding the axis, deformation of the deformable structure resulting in actuation of the switch.

U.S. Pat. No. 6,093,066, which issued to Isogawa et al on Jul. 25, 2000, describes a control for an outboard motor. An outboard motor throttle and transmission control employs a bowden wire mechanism for transmitting control signals from the tiller handle to the engine throttle and transmission control. The control handle is pivotally mounted on the front end of a tiller arm and the wire actuators exit the control handle and enter the protective cowling on opposite sides of a longitudinal center plane or on opposite sides of the protective cowling so as to increase the length of the wire actuator in this area so as to facilitate their bending without kinking.

U.S. Pat. No. 5,797,777, which issued to Tsunekawa et al on Aug. 25, 1998, describes an outboard motor control. The control handle for the tiller of an outboard motor embodies a twist grip throttle control, a pivotally supported transmission control, and a trim switch. All of these control components are juxtaposed to each other but oriented in such a way so that actuation of one will not affect accidental actuation of any other control. The trim control is disposed in a projection on the lower side of the outer housing of the control handle and is disposed inwardly from the sides thereof and is protected by a flange.

U.S. Pat. No. 4,337,053, which issued to Stevens on Jun. 29, 1982, describes an idle adjustment control and sculptured twist grip throttle control handle for a marine propulsion device. A marine propulsion device comprises a marine propulsion unit including an engine and a rotatably mounted propeller which is operatively connected with the engine. A steering tiller is attached to the marine propulsion unit and a throttle grip has an exterior gripping surface which is rotatably attached to the steering tiller. The throttle grip is connected with the throttle for moving the throttle between the idle position and the advanced position in response to rotation of the throttle grip. An idle adjustment assembly is carried by the throttle grip and is operatively connected with the throttle linkage assembly for adjusting the low operational engine speed above the true idle speed of the engine.

U.S. Pat. No. 4,650,429, which issued to Boda on Mar. 17, 1987, discloses a throttle friction device for an outboard motor. An adjustment is provided for the friction between a throttle hand grip and the steering arm of an outboard motor. An internal cam surface in a knob presses against a corresponding external cam surface on the throttle control handle to allow adjustment of the friction between the throttle control handle and the steering arm tube by rotating the knob.

U.S. Pat. No. 5,340,342, which issued to Boda et al on Aug. 23, 1994, discloses a universal tiller handle with shift and throttle. A tiller handle is provided for use with one or more push-pull cables innerconnected to the shift and the throttle mechanisms of an outboard marine engine to control the shift and the throttle operations of the engine. The tiller handle includes a rotatable cam member with one or more cam tracks located on the outer surface. Each push-pull cable is maintained within a distinct cam track such that rotating the rotatable cam member actuates the push-pull cables thereby controlling the operation of the shift and the throttle mechanisms of the engine.

U.S. Pat. No. 5,421,755, which issued to Kakizaki on Jun. 6, 1995, describes a steering handle. Several embodiments of steering controls for connection to larger displacement outboard motors that are normally remotely controlled are described. Each tiller assembly includes at least a throttle control that is connected to the throttle control cable of the outboard motor and a transmission control that is connected to the transmission control cable of the outboard motor. In addition, embodiments of interlocks are depicted that are supported in the tiller assembly and which control the maximum speed of the engine when the transmission is in neutral or reverse and which also prevents shifting into these speeds when the outboard motor is being operated at speeds higher than those maximum permitted in their respective transmission speeds.

U.S. Pat. No. 5,378,178, which issued to Haman on Jan. 3, 1995, describes a tiller arm and steering bracket assembly. A tiller arm and steering bracket assembly is described where the tiller arm is pivotally coupled to the steering bracket such that it can be selectively positioned in either a generally horizontal position or a generally vertical position. The tiller arm includes an underside having interference ribs that contact the steering bracket when the tiller arm is placed in the horizontal position. The interference ribs each have a retaining ledge that supports the tiller arm on the head portion of the steering bracket in an upright position substantially perpendicular to the steering bracket when it is placed in the vertical position. The steering bracket has integral crest formations which contact the retaining ledges to provide additional support to the tiller arm when it is placed in the vertical position. A bore formed through the steering bracket accepts a retaining pin that contacts the tiller arm at a point which prevents the tiller arm from unintentionally returning to the horizontal position. Additionally, the steering bracket may have a recess and a channel formed through the steering bracket for accepting and mounting thereto a starter switch and starter mechanism.

The patents described above are hereby expressly incorporated by reference in the description of the present invention.

Tiller arms known to those skilled in the art typically place various types of control levers and switches on the side or top portions of the arm. It is also known to those skilled in the art to locate an engine stop switch, or "kill switch", at the tip or end surface located at the distal end of the tiller arm. The function of a “kill switch” is to quickly interrupt the flow of current in a wire that causes the engine to stop functioning, typically as a result of the deprivation of electrical current to the ignition system of the engine. Other than the “kill switch”, or safety switch, control switches and push buttons are located away from the end surface at the distal end of a tiller handle.

It would be significantly beneficial if a tiller handle could be provided with control switches at the end surface of the distal portion of a tiller handle which allow the operator of a marine vessel to advantageous affect the trim or tilt of the outboard motor without having to direct the operator’s attention away from the forward portion of the marine vessel or the area in front of the marine vessel. It would also be significantly advantageous if the operator of a marine vessel could change the gear setting of the outboard motor without having to turn away from the bow of the marine vessel. It would be particularly advantageous if these goals could be achieved without creating any possible interference between the operator’s maneuvering of the accelerator grip of the tiller handle and these control switches or push buttons.

SUMMARY OF THE INVENTION

A control handle of an outboard motor made in accordance with the preferred embodiment of the present invention comprises an arm extending from the outboard motor, wherein the control handle is attached to the arm for rotation about a rotational axis of the control handle. Typically, the control handle is rotatable about an axis that extends through the length of the tiller arm. An actuator is associated with the outboard motor and is connected to a control device of the outboard motor. The actuator can be an electrical relay associated with a switch that affects the status of the control device. More particularly, the switch can actuate a hydraulic pump and/or a hydraulic valve that controls the movement of a hydraulic cylinder that moves the control device. The control device can be a trim component which causes the outboard motor to tilt about a horizontal axis or, alternatively, the control device can be a portion of a gear selector that is moved by a hydraulic cylinder controlled by the actuator. Alternatively, the actuator can be a microprocessor portion of an engine control unit (ECU) that receives signals from the control handle and causes changes to occur in a control device in response to those signals. The present invention further comprises a push button switch attached to the control handle and connected in signal communication with the actuator. The push button switch is movable by an operator of the outboard motor to an electrical state and the actuator is responsive to the push button being in the electrical state. The electrical state of the push button can be a closed state or an open state. Typically, one push button would cause the outboard motor to tilt upward when in a closed state and the other push button would cause the outboard to tilt downward when in a closed state. When either of the push buttons is in an open state, no signal is provided to the actuator and, as a result, no trim movement of the outboard motor is caused.

The control handle of the present invention further comprises an end portion of the control handle and the electrical state of the push button is caused by movement of the push button in a direction generally parallel to the rotational axis of the control handle. In a particularly preferred embodiment of the present invention, the control handle further comprises an end surface of the end portion and the electrical state of the push button is caused by movement of the push button in a direction generally perpendicular to the end surface of the end portion of the control handle.

In certain embodiments of the present invention, numerous push buttons provide signals to numerous actuators that, in turn, control the movement of numerous control devices. These push buttons can result in movement of the trim/tilt mechanism of the outboard motor and/or the movement of a gear selector of the outboard motor. In addition to the control push buttons, a conventional “kill switch” can be incorporated in the end surface of the end portion of the control handle. The conventional “kill switch”, when applied in this way in conjunction with the present invention, operates in a manner that is generally well known to those skilled in the art of outboard motors and is not a functional part of the present invention.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
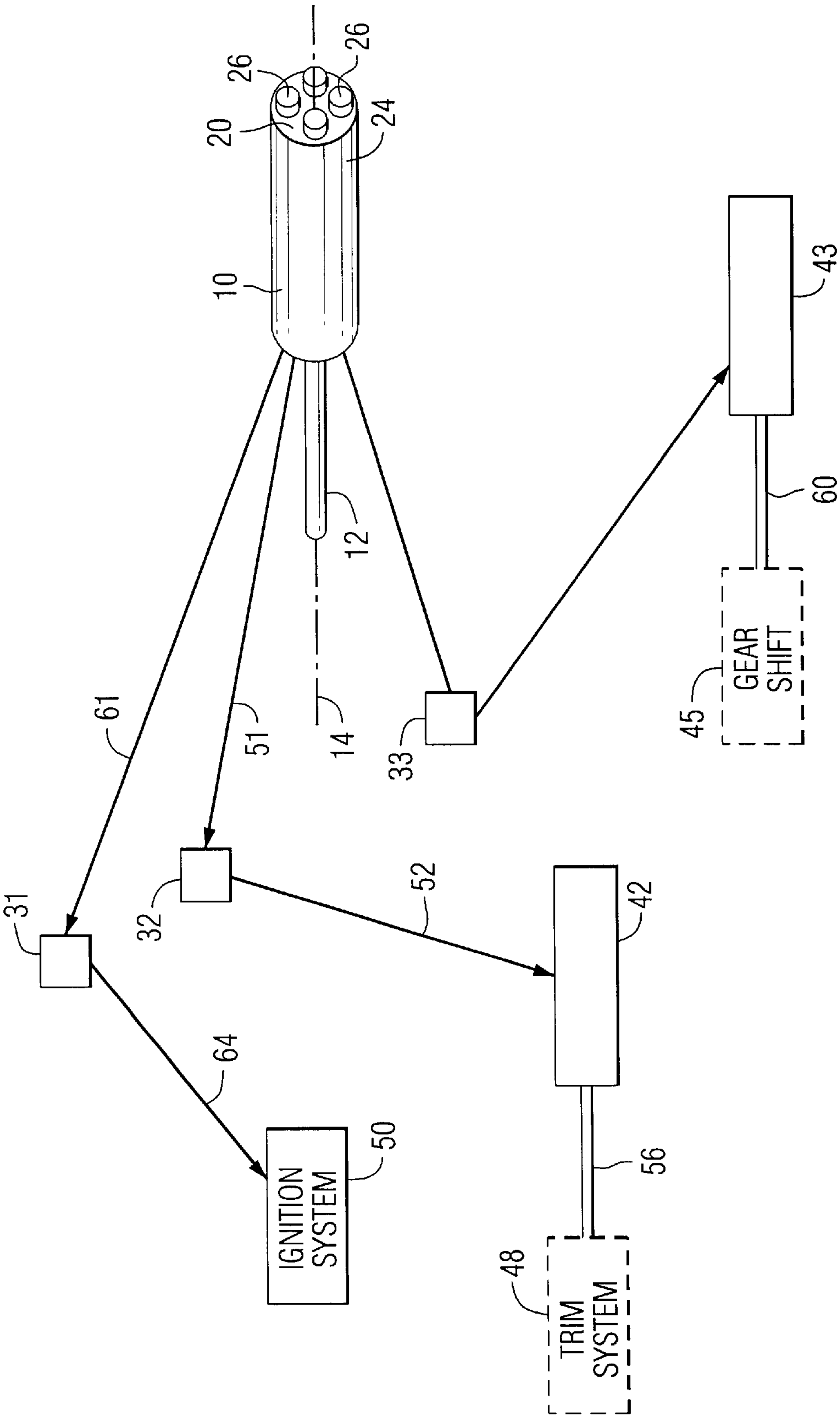
FIGS. 1 and 2 show two simplified representations of two embodiments of the present invention.

Throughout the description of the preferred embodiment of the present invention, like components will be identified by like reference numerals.

FIG. 1 is a schematic representation of a control handle 10 attached to a tiller 12 for rotation relative to the tiller 12 about a rotational axis 14 that extends at least partially along and through the structure of the tiller. The embodiment shown in FIG. 1 shows an end surface 20 at the distal end portion 24 of the control handle 10. A plurality of push buttons 26 are shown attached to the control handle 10. When one of the push buttons 26 is depressed by the operator of a marine vessel in such a way that the push button moves relative to the control handle 10 in a direction that is generally parallel to the rotational axis 14 and generally perpendicular to the end surface 20, a signal is provided to an associated actuator. In FIG. 1, the actuators are identified by reference numerals 31, 32, and 33. The actuators, 31–33, can comprise a relay and switch that provides a signal to an associated control device. For example, actuator 33 is associated with a hydraulic cylinder 43 which, when operated, affects a gear shift mechanism 45. Actuator 32 is associated with a hydraulic cylinder 42 which, when operated, affects a trim system 48. Actuator 31 is associated with an ignition system 50.

With continued reference to FIG. 1, the operator of the marine vessel can cause the trim system 48 to move in a first direction by depressing an associated one of the push buttons 26 which provides a signal on line 51 to the actuator 32. In response, the actuator 32 provides a signal on line 52 which causes the hydraulic cylinder 42 to extend its piston shaft 56 and cause the outboard motor to change its trim angle. For example, the outward movement of the piston shaft 56 from the cylinder 42 would typically cause the gear case at the lower portion of the outboard motor to pivot away from the transom of the marine vessel. An opposite movement by the piston shaft 56 would cause the outboard motor to trim inward in is the opposite direction.

The gear shift device 45 would operate in a manner that responds to movement of the piston shaft 60 of hydraulic cylinder 43 in such a way that the gear selector is moved from a forward to a neutral position or from a reverse to a neutral position in response to movement of the piston shaft 60 relative to the housing of the cylinder 43.

The ignition system 50 can be affected by an associated push button 26 in such a way that the engine can be turned off by a signal online 61 to an actuator 31 which, in turn, can provide an electrical signal on line 64 which causes the engine to stop operating. Of the various control mechanisms shown in FIG. 1, the simplest is that which affects the ignition system 50 in a way that is generally similar to the manner in which a "kill switch" operates as a safety device which allows the operator of the marine vessel to quickly stop the operation of the engine.

Figure 2:
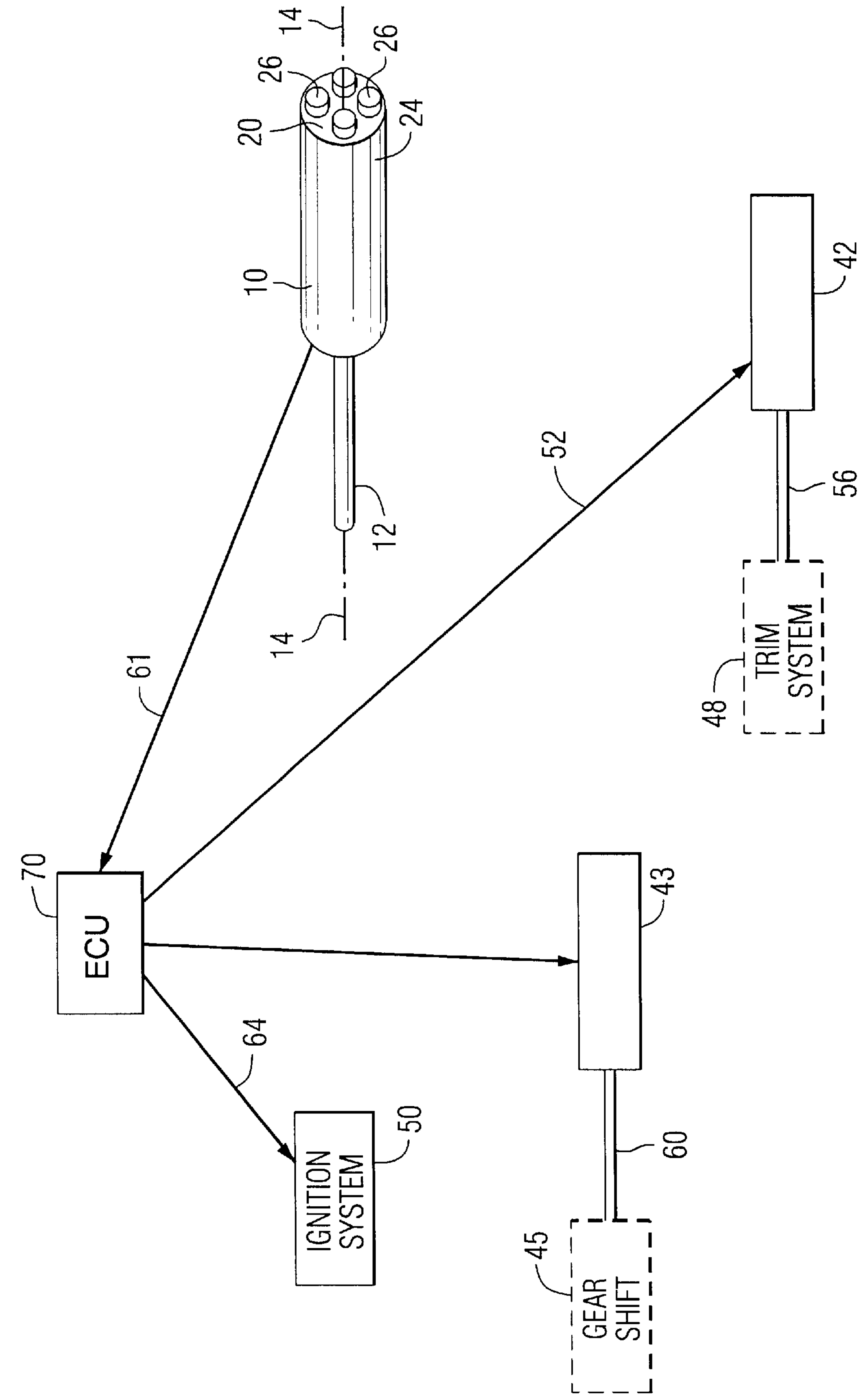

FIG. 2 illustrates an alternative embodiment of the present invention that is very similar to the one described above in conjunction with FIG. 1, but wherein an engine control unit (ECU) 70 is used instead of a plurality of actuators such as the relays and switches described above in conjunction with FIG. 1. In the system illustrated in FIG. 2, signals from the push buttons 26 are received by the engine control unit 70 and the commands transmitted to the various control devices are provided from the engine control unit 70. The version of the present invention shown in FIG. 2 allows a higher degree of control over the operation of the control devices. In other words, the engine control unit 70 typically comprises a microprocessor that can interrogate signals from the control handle 10 and apply preselected criteria to these command signals in order to add an additional layer of safety and a more sophisticated level of control over the control devices.

Figure 3:
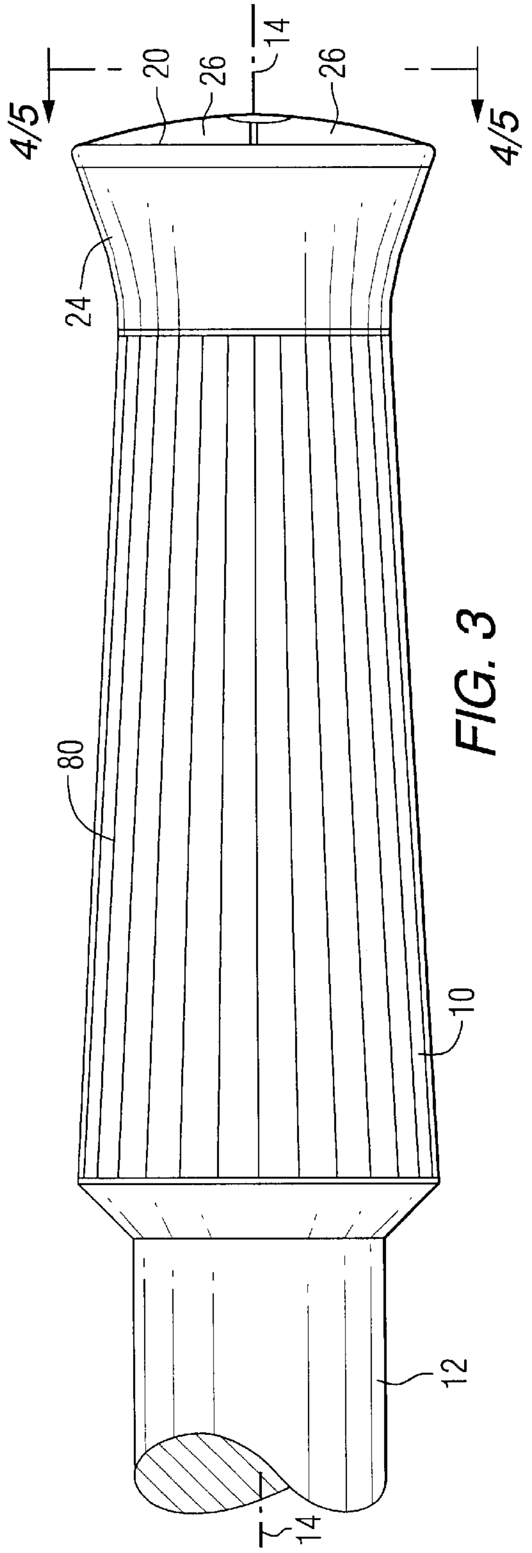
FIG. 3 is a side view of a control handle of a tiller arm made in accordance with the present invention.

FIG. 3 is a more detailed representation of the control handle 10 of the present invention. As illustrated in FIG. 3, the control has a hand grip portion 80 that allows the operator of a marine vessel to easily rotate the hand grip portion 80 about the rotational axis 14 to control the speed of the engine. When the operator rotates the hand grip portion 80, the end portion 24 and the push buttons 26 attached to the end portion 24 remain stationary with the tiller 12. In other words, the positions of the push buttons 26 on the end portion 24 do not rotate with the hand grip portion 80. In this way, the operator always knows where each of the push buttons is with respect to each other and with respect to the tiller 12. The end surface 20 is generally perpendicular to the rotational axis 14, although this perpendicularity is not a strict requirement in all embodiments of the present invention. When the push buttons 26 are depressed by the operator of the marine vessel, they are moved in a direction relative to the control handle 10 which is generally parallel to the rotational axis 14 and generally perpendicular to the end surface 20.

Figure 4:
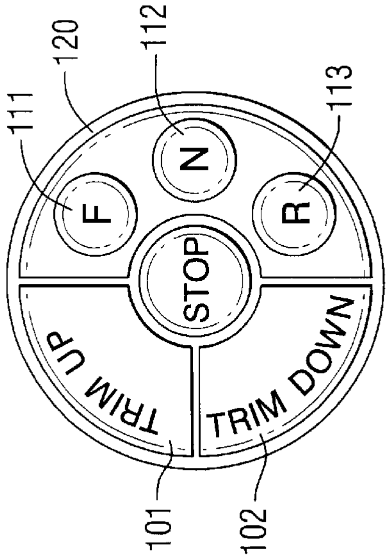

FIG. 4 shows an end view of the control handle illustrated in FIG. 3. In the version of the present invention shown in FIG. 4, trim up 101 and trim down 102 switches are located on one side of the end surface 20. On the other side of the end surface 20, forward, neutral, and reverse push buttons are provided. These are identified by reference numerals 111, 112, and 113, respectively. In the center portion of the end surface 20, a stop button 120 is provided. The stop button 120 operates in a manner generally known to those skilled in the art and provides the same function as a "kill switch" that an operator of a marine vessel can use to immediately cause the engine to stop running. It should be understood that the stop button 120, in its normal usage, is not a part of the present invention. In the terminology used to describe the present invention, a stop button 120, or "kill switch" does not operate to change the status of an actuator which, in turn, causes a control device to move. Stop switches typically only deprive the ignition system of an engine of electrical current.

Figure 5:
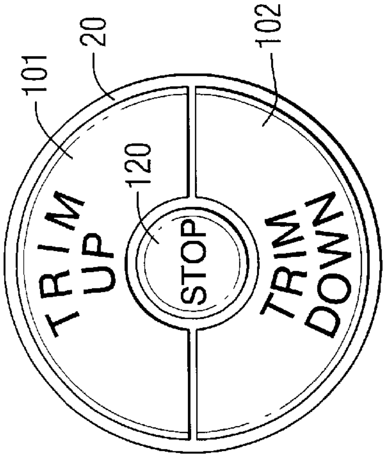
FIGS. 4 and 5 are end views of alternative embodiments of the handle shown in FIG. 3.

FIG. 5 is an alternative end view of the control handle 10 shown in FIG. 3. It shows the end surface 20 having a trim up push button 101 and a trim down push button 102, but no gear selecting push buttons such as those identified by reference numerals 111–113 in FIG. 4. In the center portion of the end surface 20 is a stop switch 120.

With reference to FIGS. 3, 4, and 5, it can be seen that an operator can maintain control of the control handle 10 by gripping the hand grip portion 80 while depressing a selected push button 26 with a finger (e.g. a thumb) of the same hand. This allows the operator to select a trim command or a gear selecting command without having to either release the grip on the handle 10 or turn away from the bow portion of the boat. It also allows the operator to manipulate the push buttons 26 without having to use the other hand which is not being used to control the hand grip portion 20 of the control handle 10. Other control handles that are known to those skilled in the art require one of several disadvantageous maneuvers on the part of the operator of the marine vessel. Certain known tiller handles incorporate gear change levers or push buttons on the side portion of the tiller handle 12 that are not proximate the distal end of the tiller handle. This requires the operator of the marine vessel to either release a grip on the grip portion 80 or, alternatively, use the other hand to manipulate the control mechanisms. If the gear change lever is located on the outboard motor itself, changing gears typically requires the operator of the marine vessel to turn away from the bow of the boat and face the outboard motor in a rearward direction to manipulate the gear change handle. The present invention places all of the control push buttons on the end surface 20 of the control handle 10 so that the operator can actuate the push buttons without releasing a grip on the grip portion 80. While the push buttons are depressed by a finger of the controlling hand of the marine vessel operator, continued grip is maintained for both steering and engine speed control purposes.

Figure 6:
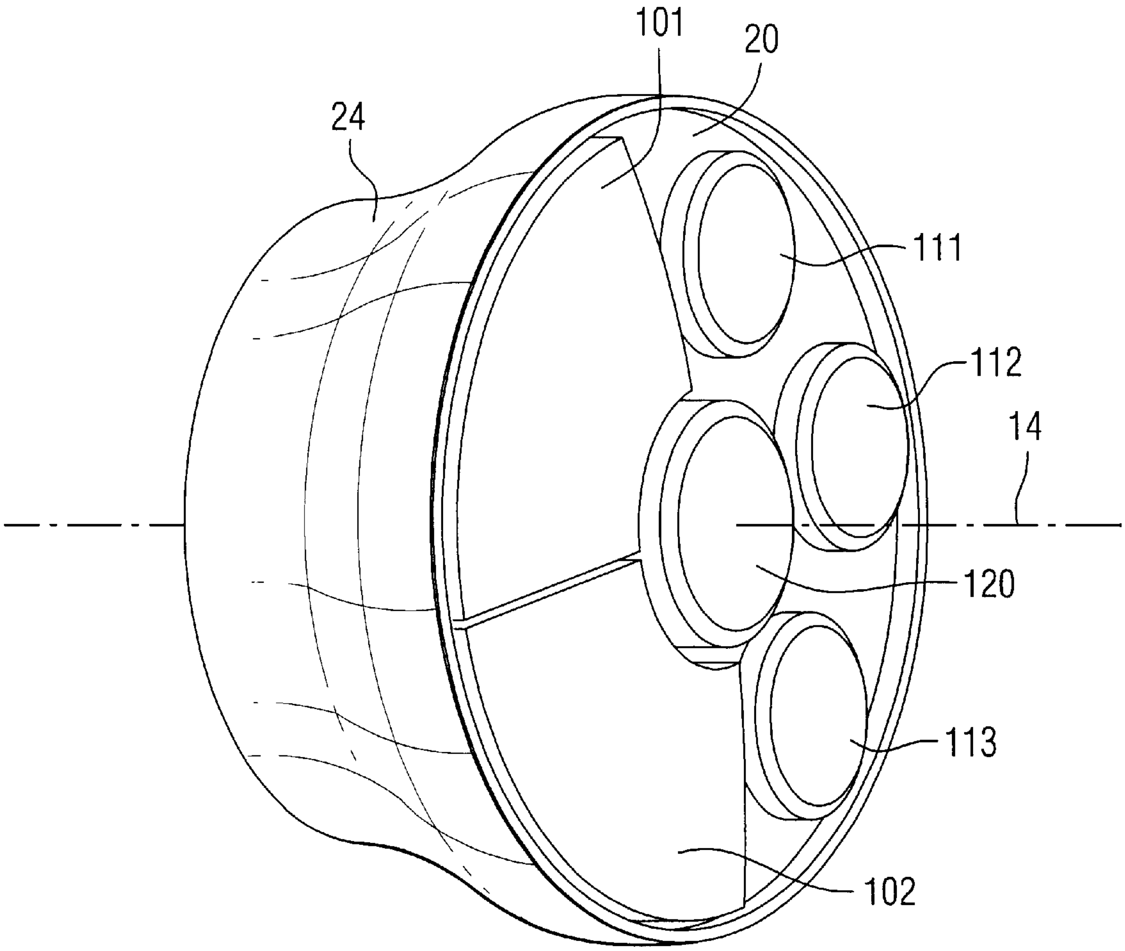
FIG. 6 is an isometric view of the end portion of the present invention illustrated in FIG. 4.

FIG. 6 is an isometric view of the end portion 24 of the present invention described above in conjunction with FIG. 4. The trim up and trim down push buttons, 101 and 102, and the gear selecting push buttons, 111–113, are easily accessible by a finger of the marine vessel operator without requiring the operator to release a grip on the grip portion 80 of the control handle 10. The operator can also easily access the stop push button 120 in the event that the operator wishes to stop the operation of the engine.

Although the present invention has been described in particular detail and illustrated to show preferred embodiments of the present invention, it should be understood that alternative embodiments are also within its scope.

We claim:

1. A control handle of an outboard motor, comprising:
   - an arm extending from said outboard motor, said control handle being attached to said arm for rotation about a rotational axis of said control handle;
   - an actuator associated with said outboard motor, said actuator being connected to a control device of said outboard motor;
   - a pushbutton switch attached to said control handle, said pushbutton being connected in signal communication with said actuator and movable by an operator of said outboard motor to an electrical state, said actuator being responsive to said pushbutton being in said electrical state;

an end portion of said control handle, said electrical state of said pushbutton being caused by movement of said pushbutton in a direction generally parallel to said rotational axis; and an end surface of said end portion, said electrical state of said pushbutton being caused by movement of said pushbutton in a direction generally perpendicular to said end surface.

2. The control handle of claim 1, further comprising:

a hand grip rotatably attached to said arm, said end portion being rigidly attached to said arm, said hand grip-being rotatable relative to said arm and rotatable relative to said end portion, said end portion being stationary relative to said arm and independent of rotation of said hand grip.

3. The control handle of claim 1, wherein:

said control device is a trim cylinder and said actuator is a microprocessor of an engine control unit which is connected in signal communication with said trim cylinder.

4. The control handle of claim 1, wherein:

said control device is a gear shift mechanism and said actuator is an electrical relay connected in signal communication with said gear shift mechanism.

5. The control handle of claim 1, wherein:

said control device is a gear shift mechanism and said actuator is a microprocessor of an engine control unit which is connected in signal communication with said gear shift mechanism.

6. A control handle of an outboard motor, comprising:

an arm extending from said outboard motor, said outboard motor being rotatable about a generally vertical steering axis, said control handle being attached to said arm for rotation about a rotational axis of said control handle, said rotational axis being generally perpendicular about said generally vertical steering axis;

a first actuator associated with a first control device of said outboard motor;

a first pushbutton switch attached to said control handle, said first pushbutton being connected in signal communication with said first actuator and movable by an operator of said outboard motor to an electrical state of said first pushbutton, said first actuator being responsive to said electrical state of said first pushbutton;

an end portion of said control handle, said electrical state of said first pushbutton being caused by movement of said first pushbutton in a direction generally parallel to said rotational axis; and an end surface of said end portion, said electrical state of said first pushbutton being caused by movement of said first pushbutton in a direction generally perpendicular to said end surface.

7. The control handle of claim 6, further comprising:

a second actuator associated with a second control device of said outboard motor; and a second pushbutton switch attached to said control handle, said second pushbutton being connected in signal communication with said second actuator and movable by an operator of said outboard motor to an electrical state of said second pushbutton, said second actuator being responsive to said electrical state of said second pushbutton.

8. The control handle of claim 7, further comprising:

a third actuator associated with a third control device of said outboard motor; and a third pushbutton switch attached to said control handle, said third pushbutton being connected in signal communication with said third actuator and movable by an operator of said outboard motor to an electrical state of said third pushbutton, said third actuator being responsive to said electrical state of said third pushbutton.

9. The control handle of claim 6, further comprising:

a hand grip rotatably attached to said arm, said end portion remaining stationary with respect to said arm independently of rotational movement of said hand grip relative to said arm.

10. The control handle of claim 9, further comprising:

an end surface of said end portion, said electrical state of said second pushbutton being caused by movement of said second pushbutton in a direction generally perpendicular to said end surface.

11. The control handle of claim 8, further comprising:

an end portion of said control handle, said electrical state of said third pushbutton being caused by movement of said third pushbutton in a direction generally parallel to said rotational axis; and an end surface of said end portion, said electrical state of said third pushbutton being caused by movement of said third pushbutton in a direction generally perpendicular to said end surface.

* * * * *